United States Patent
Toyoshima et al.

(10) Patent No.: US 11,359,060 B2
(45) Date of Patent: Jun. 14, 2022

(54) METHOD OF PRODUCING RECLAIMED CARBON FIBER BUNDLES, RECLAIMED CARBON FIBERS, OR RECLAIMED MILLED CARBON FIBERS, DEVICE FOR PRODUCING RECLAIMED CARBON FIBER BUNDLES, METHOD OF PRODUCING CARBON FIBER REINFORCED RESIN, AND RECLAIMED CARBON FIBER BUNDLES

(71) Applicant: Shinryo Corporation, Kita Kyushu (JP)

(72) Inventors: Hirokazu Toyoshima, Kita Kyushu (JP); Tooru Takeda, Kita Kyushu (JP); Takahisa Hara, Kita Kyushu (JP); Koujirou Masuda, Kita Kyushu (JP); Yasuo Yamaguchi, Kita Kyushu (JP); Masatoshi Nakamura, Kita Kyushu (JP); Yousuke Maruta, Kita Kyushu (JP); Masaki Satou, Kita Kyushu (JP)

(73) Assignee: Shinryo Corporation, Kita Kyushu (JP)

( * ) Notice: Subject to any disclaimer, the term of this patent is extended or adjusted under 35 U.S.C. 154(b) by 128 days.

(21) Appl. No.: 16/682,279

(22) Filed: Nov. 13, 2019

(65) Prior Publication Data
US 2020/0079918 A1    Mar. 12, 2020

Related U.S. Application Data

(63) Continuation of application No. PCT/JP2018/017784, filed on May 8, 2018.

(30) Foreign Application Priority Data
May 17, 2017    (JP) .............................. JP2017-097990

(51) Int. Cl.
C08J 5/04        (2006.01)
B29B 17/04       (2006.01)
(Continued)

(52) U.S. Cl.
CPC ........... *C08J 5/042* (2013.01); *B29B 17/0412* (2013.01); *B29K 2105/06* (2013.01); *B29K 2307/04* (2013.01)

(58) Field of Classification Search
CPC ..... B09B 3/0083; B09B 3/0091; B29B 17/04; B29B 17/0412; B29K 2307/04;
(Continued)

(56) References Cited

U.S. PATENT DOCUMENTS

| 6,032,342 A | 3/2000 | Kawabe et al. |
| 2013/0196154 A1 | 8/2013 | Ortlepp et al. |

(Continued)

FOREIGN PATENT DOCUMENTS

| CN | 103665427 A | 3/2014 |
| DE | 10 2011 118 296 A1 | 10/2012 |

(Continued)

OTHER PUBLICATIONS

Merriam Websters definition of crushing, accessed online Nov. 19, 2021.*

(Continued)

*Primary Examiner* — Camie S Thompson
(74) *Attorney, Agent, or Firm* — Oblon, McClelland, Maier & Neustadt, L.L.P.

(57) ABSTRACT

There are provided a method of producing reclaimed carbon fibers in which, even if a carbon fiber reinforced resin is not heated at 800° C. or higher, pieces of carbon fiber base material that are contained in the carbon fiber reinforced resin can be directly collected, and the variation in the resin residue content in the collected pieces of carbon fiber base (Continued)

material can be reduced, a device for producing reclaimed carbon fibers that can be used in the production method, and a method of producing a carbon fiber reinforced resin in which reclaimed carbon fibers can be effectively used.

A method of producing reclaimed carbon fiber bundles which is a method of obtaining pieces of carbon fiber base material as reclaimed carbon fiber bundles from a carbon fiber reinforced resin (100) containing a plurality of sheet-like pieces of carbon fiber base material and a matrix resin, including heating the carbon fiber reinforced resin (100) and thermally decomposing the matrix resin to obtain a heat-treated product (102); and crushing the heat-treated product (102) and separating the plurality of pieces of carbon fiber base material into individual reclaimed carbon fiber bundles.

20 Claims, 4 Drawing Sheets

(51) Int. Cl.
  *B29K 105/06*  (2006.01)
  *B29K 307/04*  (2006.01)
(58) Field of Classification Search
  CPC ..... B29K 2105/06; Y02W 30/62; C08J 11/12;
    C08J 5/04; C08J 5/042; C80J 5/04; C80J 5/042
  USPC .............................................. 428/367, 297.4
  See application file for complete search history.

(56) References Cited

U.S. PATENT DOCUMENTS

| | | |
|---|---|---|
| 2016/0039118 A1 | 2/2016 | Gehr |
| 2016/0060535 A1 | 3/2016 | Gehr |
| 2017/0350040 A1 | 12/2017 | Ijuin |

FOREIGN PATENT DOCUMENTS

| | | |
|---|---|---|
| DE | 10 2011 115 966 A1 | 4/2013 |
| EP | 2 810 979 A1 | 12/2014 |
| JP | 59-100720 A | 6/1984 |
| JP | 59-130355 A | 7/1984 |
| JP | 4-323009 A | 11/1992 |
| JP | 6-99160 A | 4/1994 |
| JP | 9-12730 A | 1/1997 |
| JP | 11-290822 A | 10/1999 |
| JP | 2000-96387 A | 4/2000 |
| JP | 3401865 B2 | 4/2003 |
| JP | 2005-307121 A | 11/2005 |
| JP | 2008-254191 A | 10/2008 |
| JP | 2011-122032 A | 6/2011 |
| JP | 2013-147545 A | 8/2013 |
| JP | 2013-199607 A | 10/2013 |
| JP | 5498144 B2 | 5/2014 |
| JP | 2016-108684 A | 6/2016 |
| JP | 2016-521295 A | 7/2016 |
| JP | 2017-66383 A | 4/2017 |
| JP | 2017-132933 A | 8/2017 |
| WO | WO 97/41285 A1 | 11/1997 |
| WO | WO 2014/037724 A1 | 3/2014 |
| WO | WO 2016-104467 A1 | 6/2016 |

OTHER PUBLICATIONS

Merriam Websters definition of disintegrating, accessed online Nov. 19, 2021.*
Merriam Websters definition of decompositon, accesed online Nov. 19, 2021.*
International Search Report dated Aug. 7, 2018 in PCT/JP2018/017784 filed on May 8, 2018 (with English translation).
Japanese Office Action dated Mar. 5, 2019 in Japanese Patent Application No. 2018-562386 (with English translation), citing documents AQ-AS, AU-AV and BO-BV, 20 pages.
Extended European Search Report dated Apr. 30, 2020, in Patent Application No. 18801569.7, citing documents AA-AB and AN-AV therein, 9 pages.

* cited by examiner

METHOD OF PRODUCING RECLAIMED CARBON FIBER BUNDLES, RECLAIMED CARBON FIBERS, OR RECLAIMED MILLED CARBON FIBERS, DEVICE FOR PRODUCING RECLAIMED CARBON FIBER BUNDLES, METHOD OF PRODUCING CARBON FIBER REINFORCED RESIN, AND RECLAIMED CARBON FIBER BUNDLES

The present application is a continuation application of International Application No. PCT/JP2018/017784, filed on May 8, 2018, which claims priority of Japanese Patent Application No. 2017-097990, filed May 17, 2017, the content of which is incorporated herein by reference.

TECHNICAL FIELD

The present invention relates to a method of producing reclaimed carbon fiber bundles, reclaimed carbon fibers, and reclaimed milled carbon fibers, and a device for producing reclaimed carbon fiber bundles, and a method of producing a carbon fiber reinforced resin, and reclaimed carbon fiber bundles.

BACKGROUND ART

Regarding a method of collecting carbon fibers from a used carbon fiber reinforced resin product (molded article), cut-off pieces of an intermediate product (prepreg) of a carbon fiber reinforced resin produced in a production process, and the like, for example, the following methods have been proposed.
(1) A method of producing carbon fiber masses in which a carbon fiber reinforced plastic is subjected to dry distillation under a substantially non-oxidizing atmosphere in a temperature range of 300 to 1,000° C., and then disintegrated into a scaly form, and there is 90 mass % or more of carbon fiber masses having a maximum size of 30 mm or less in the population, and there is 60 mass % or more of carbon fiber masses having a ratio of the maximum size to the thickness of the carbon fiber mass that is 3 or more (Patent Document 1).
(2) A method of collecting carbon fibers in which a processing object containing a carbon fiber reinforced plastic including a laminated carbon fiber base fabric in which carbon fiber base fabric formed of fiber bundles in which carbon fibers are bundled are laminated is treated with superheated steam at 800° C. or higher, and thus a plastic in the carbon fiber reinforced plastic is removed, base fabric layers of the laminated carbon fiber base fabric are separated, and the carbon fibers are collected while maintaining the fiber bundles (Patent Document 2).

CITATION LIST

Patent Literature

Patent Document 1

Japanese Patent No. 3401865

Patent Document 2

Japanese Patent No. 5498144

SUMMARY OF INVENTION

Technical Problem

However, in the method (1), since the heat-treated product in which carbon fibers are fixed by the thermal decomposition product (carbide, etc.) of the matrix resin disintegrates, the lengths of the collected carbon fibers are not uniform. Therefore, the collected carbon fibers can be reused only for limited applications such as carbon fiber-containing thermoplastic resin pellets and a carbon fiber-containing cement.

In the method (2), since the matrix resin is sufficiently thermally decomposed, the pieces of carbon fiber base material that are contained in the carbon fiber reinforced resin (long fiber bundles, short fiber bundles, fabrics, etc.) can be directly collected. Therefore, the collected carbon fibers can be reused for various applications.

However, in the method (2), since the carbon fiber reinforced resin is heated at 800° C. or higher, carbon fibers also deteriorate due to thermal decomposition and mechanical properties and the like of the carbon fibers deteriorate. On the other hand, when the carbon fiber reinforced resin is heated at a temperature lower than 800° C., since thermal decomposition of the matrix resin becomes insufficient, the plurality of pieces of carbon fiber base material become fixed to each other due to the resin residue such as thermal decomposition products of the matrix resin. Therefore, it is not possible to separate the pieces of carbon fiber base material and it is not possible to separate the plurality of pieces of carbon fiber base material into individual reclaimed carbon fiber bundles.

The present invention provides a method of producing reclaimed carbon fiber bundles, reclaimed carbon fibers, or reclaimed milled carbon fibers in which, even if a carbon fiber reinforced resin is not heated at 800° C. or higher, pieces of carbon fiber base material that are contained in the carbon fiber reinforced resin can be directly collected, and the variation in the resin residue content in the collected pieces of carbon fiber base material can be reduced, a device for producing reclaimed carbon fiber bundles that can be used in the production method, a method of producing a carbon fiber reinforced resin in which reclaimed carbon fiber bundles, reclaimed carbon fibers, and reclaimed milled carbon fibers can be effectively used, and reclaimed carbon fiber bundles.

Solution to Problem

The present invention includes the following aspects.
<1> A method of producing reclaimed carbon fiber bundles which is a method of obtaining pieces of carbon fiber base material as reclaimed carbon fiber bundles from a carbon fiber reinforced resin containing a plurality of pieces of carbon fiber base material and a matrix resin, the method including:
heating the carbon fiber reinforced resin and thermally decomposing the matrix resin to obtain a heat-treated product; and
separating the heat-treated product into a plurality of pieces of carbon fiber base material by crushing.
<2> A method of producing reclaimed carbon fiber bundles which is a method of obtaining pieces of carbon fiber base material as reclaimed carbon fiber bundles from a laminate in which a plurality of prepregs including the pieces of carbon fiber base material and a matrix resin are laminated, the method including:

heating the laminate and thermally decomposing the matrix resin to obtain a heat-treated product; and separating the heat-treated product into the plurality of pieces of carbon fiber base material by crushing.

<3> The method of producing reclaimed carbon fiber bundles according to <1> or <2>, wherein the temperature at which the carbon fiber reinforced resin is heated is 300 to 700° C.

<4> The method of producing reclaimed carbon fiber bundles according to any one of <1> to <3>, wherein the carbon fiber reinforced resin is heated under a non-oxidizing atmosphere.

<5> The method of producing reclaimed carbon fiber bundles according to <4>, wherein the non-oxidizing atmosphere is a nitrogen gas atmosphere or a superheated steam atmosphere.

<6> The method of producing reclaimed carbon fiber bundles according to any one of <1> to <5>, wherein the heat-treated product is crushed by a biaxial roller crusher, a multi-axis roller crusher or a hammer crusher.

<7> The method of producing reclaimed carbon fiber bundles according to any one of <1> to <6>, wherein the pieces of carbon fiber base material separated by crushing are cut to obtain chip-like fiber bundles.

<8> A method of producing reclaimed carbon fibers, including:

obtaining reclaimed carbon fiber bundles using the production method according to any one of <1> to <7>; and additionally heating the reclaimed carbon fiber bundles under an oxidizing atmosphere.

<9> A method of producing reclaimed milled carbon fibers, including:

obtaining reclaimed carbon fiber bundles or reclaimed carbon fibers using the production method according to any one of <1> to <8>; and pulverizing the reclaimed carbon fiber bundles or the reclaimed carbon fibers to obtain milled carbon fibers.

<10> A method of producing a carbon fiber reinforced resin, including:

obtaining reclaimed carbon fiber bundles, reclaimed carbon fibers or reclaimed milled carbon fibers using the production method according to any one of <1> to <9>; and producing a carbon fiber reinforced resin containing the reclaimed carbon fiber bundles, the reclaimed carbon fibers, or the reclaimed milled carbon fibers, and a matrix resin.

<11> A method of producing carbon fiber reinforced resin pellets, including:

obtaining reclaimed carbon fiber bundles, reclaimed carbon fibers, or reclaimed milled carbon fibers using the production method according to any one of <1> to <9>;

kneading the reclaimed carbon fiber bundles, the reclaimed carbon fibers or the reclaimed milled carbon fibers, and a thermoplastic resin to obtain a kneaded material; and processing the kneaded material into pellets.

<12> A device for producing reclaimed carbon fiber bundles which is a device for obtaining pieces of carbon fiber base material as reclaimed carbon fiber bundles from a carbon fiber reinforced resin, the device including:

a heating furnace that is configured to heat the carbon fiber reinforced resin to obtain a heat-treated product; and a crusher that is configured to crush the heat-treated product.

<13> The device for producing reclaimed carbon fiber bundles according to <12>, wherein the crusher is a biaxial roller crusher, a multi-axis roller crusher or a hammer crusher.

<14> Reclaimed carbon fiber bundles having an average value of thicknesses that is 0.01 to 1 mm.

<15> The reclaimed carbon fiber bundles according to <14>, wherein the standard deviation of the thicknesses of the reclaimed carbon fiber bundles is 0.01 to 0.5 mm.

<16> The reclaimed carbon fiber bundles according to <14> or <15>, wherein an average resin residue amount with respect to a carbon fiber reinforced resin after a thermal decomposition treatment is 0.1 to 30 mass %.

Advantageous Effects of Invention

According to the method of producing reclaimed carbon fiber bundles of the present invention, even if a carbon fiber reinforced resin is not heated at 800° C. or higher, pieces of carbon fiber base material that are contained in the carbon fiber reinforced resin can be directly collected as reclaimed carbon fiber bundles, and the variation in the resin residue content in the collected reclaimed carbon fiber bundles can be reduced. Since the collected reclaimed carbon fiber bundles have a thin thickness, secondary processing such as cutting, disintegrating, or pulverizing is easy and wearing of the blade can be reduced. In addition, compared to the case where reclaimed carbon fibers that have not been crushed are subjected to a secondary heat treatment, reclaimed carbon fiber bundles that have been crushed have a significantly increased surface area so that a uniform secondary heat treatment can be performed. In addition, the uniformity of the thickness of the reclaimed carbon fiber bundles is favorable and quantitative feeding properties are improved.

The device for producing reclaimed carbon fiber bundles according to the present invention can be used as in the method of producing reclaimed carbon fiber bundles according to the present invention.

According to the method of producing a carbon fiber reinforced resin of the present invention, reclaimed carbon fiber bundles, reclaimed carbon fibers, and reclaimed milled carbon fibers can be effectively used.

DESCRIPTION OF EMBODIMENTS

Figure 1:
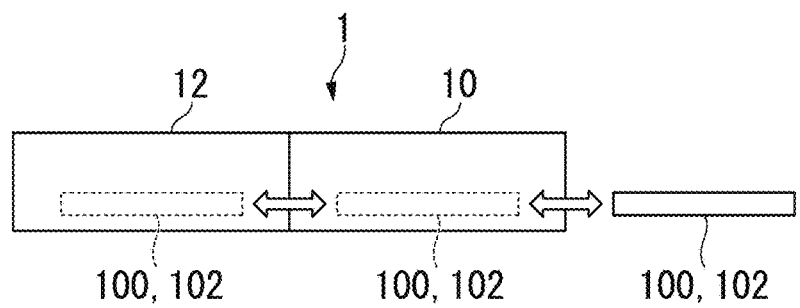
FIG. 1 is a configuration diagram schematically showing an example of a heat treatment device.

The following definitions of terms apply throughout this specification and the scope of the claims.

"Carbon fiber reinforced resin" refers to those containing a carbon fiber and a matrix resin and includes a product after molding and an intermediate product before molding.

"Crushing" means applying a pressure to a heat-treated product in which a plurality of pieces of carbon fiber base material become fixed to each other due to a resin residue such as matrix resin thermal decomposition products, and disintegrating it into individual pieces of carbon fiber base material while minimizing breakage of the pieces of carbon fiber base material.

"Carbon fiber bundle" refers to a bundle of carbon fibers in which individual carbon fiber strands are bonded by a resin or a thermal decomposition product of a resin and which includes a fabric.

"Disintegration" refers to disintegrating and breaking carbon fibers.

"Pulverizing" refers to pulverizing carbon fibers into fine power.

"Non-oxidizing atmosphere" refers to an atmosphere containing no oxygen gas or an atmosphere substantially containing no oxygen gas. "Substantially containing no oxygen gas" means that, even if oxygen gas is inevitably mixed into an atmosphere when a carbon fiber reinforced resin is heated, an amount of oxygen gas is an amount in a range in which hardly any deterioration due to oxidization of carbon fibers due to oxygen gas is observed.

"Oxidizing atmosphere" refers to an atmosphere containing oxygen gas and an atmosphere other than a non-oxidizing atmosphere.

"Superheated steam" refers to steam that is heated to a temperature equal to or higher than the boiling point.

The resin residue content in the carbon fiber bundles is a value obtained by determining a fiber mass content of carbon fiber bundles according to a sulfuric acid decomposition method in JIS K 7075: 1991 and performing calculation from the formula "100–fiber mass content".

The average value of thicknesses of the reclaimed carbon fiber bundles is a value that is calculated by measuring the thickness of the reclaimed carbon fiber bundle at an arbitrary 30 points on unspecified reclaimed carbon fiber bundles and averaging the values.

The standard deviation of the thicknesses of the reclaimed carbon fiber bundles is a value calculated from the following Formula (1) by measuring the thickness x of the reclaimed carbon fiber bundle at an arbitrary 30 points on unspecified reclaimed carbon fiber bundles.

The average value of the resin residue contents in the reclaimed carbon fiber bundle is a value that is calculated by measuring the resin residue content at an arbitrary 5 points on unspecified reclaimed carbon fiber bundles and averaging the values.

The standard deviation of the resin residue contents in the reclaimed carbon fiber bundle is a value that is calculated from the following Formula (1) by measuring the resin residue content x at an arbitrary 5 points on unspecified reclaimed carbon fiber bundles.

[Math. 1]

$$\sqrt{\frac{n\sum x^2 - (\sum x)^2}{n(n-1)}} \qquad (1)$$

In this specification and the scope of the claims, "to" indicating a numerical range means that numerical values stated before and after "to" are included as a lower limit value and an upper limit value.

Dimensional ratios in FIG. 1 to FIG. 5 are provided for convenience of description, and differ from actual ratios.

<Carbon Fiber Reinforced Resin>

The carbon fiber reinforced resin in the present invention contains a plurality of pieces of carbon fiber base material and a matrix resin.

The carbon fiber reinforced resin may contain carbon fibers (milled carbon fibers, etc.) that do not constitute the carbon fiber base material, a material (reinforcing fibers other than carbon fibers, inorganic filler, etc.) other than the carbon fibers and the matrix resin, and the like.

The carbon fiber reinforced resin may be a product after molding (molded article) or an intermediate product before molding (a prepreg, a towpreg, a sheet molding compound, a stampable sheet, etc.). In addition, a laminate in which a plurality of prepregs including a single layer carbon fiber base material and a matrix resin are laminated may be used. When a laminate in which a plurality of prepregs are laminated is used as a carbon fiber reinforced resin, it is possible to increase an amount of prepregs that can be reclaimed at the same time and the reclamation treatment can be performed at low cost. When a sheet molding compound is used as a carbon fiber reinforced resin, the resin residue content in the collected pieces of carbon fiber base material can be increased and the form as a carbon fiber bundle can be easily maintained. In addition, since a chip-like carbon fiber base material can be collected simply by performing a crushing treatment, there is no need to perform a cutting process and a reclamation treatment can be performed at low cost.

The carbon fiber reinforced resin may have a complex form with other members (a fiber reinforced resin containing reinforcing fibers other than carbon fibers, a resin molded article containing no reinforcing fibers, a metal, a ceramic, etc.).

The shape of the carbon fiber reinforced resin is not particularly limited. Examples of the shape of the carbon fiber reinforced resin include a sheet shape, a plate shape, a cross-sectional L shape (angle shape), a cross-sectional T shape, a cross-sectional C shape (channel shape), a cross-sectional H shape, a square pipe shape, a round pipe shape, or any 3D shape.

(Carbon Fiber Base Material)

The number of layers of the carbon fiber base material contained in the carbon fiber reinforced resin is two or more. The number of layers of the carbon fiber base material is appropriately set depending on applications, characteristics, and the like of the carbon fiber reinforced resin, and is not particularly limited as long as two or more layers are provided.

The carbon fiber base material may have a sheet form or a chip form.

Examples of the form of the sheet-like carbon fiber base material include a fiber bundle (tow) in which a plurality of carbon fibers are aligned in one direction; a fabric using carbon fiber bundles for warp and weft; and a carbon fiber non-woven fabric.

Examples of the form of the chip-like carbon fiber base material include a chopped carbon fiber obtained by cutting a fiber bundle and a chip-like fabric.

Examples of fiber bundles include long fiber bundles arranged in a longitudinal direction of the carbon fiber reinforced resin; and short fiber bundles arranged in a width direction of the carbon fiber reinforced resin or an oblique direction with respect to a longitudinal direction of the carbon fiber reinforced resin.

The form of the carbon fiber base material contained in the carbon fiber reinforced resin may be of one type or two or more types. Examples of the plurality of pieces of carbon fiber base material contained in the carbon fiber reinforced resin include a combination of long fiber bundles and short fiber bundles, a combination of long fiber bundles, short fiber bundles, and a fabric, and a combination of long fiber bundles, short fiber bundles, and a chip.

Examples of carbon fibers include a PAN-based carbon fiber in which a polyacrylonitrile fiber is used as a raw material and a pitch-based carbon fiber in which coal pitch or petroleum pitch is used as a raw material, but due to mechanical properties of the reclaimed carbon fibers thereby becoming favorable, a PAN-based carbon fiber is preferable.

Carbon fibers may be used alone or two or more thereof may be used in combination.

The number of carbon fibers constituting a fiber bundle is appropriately set depending on applications, characteristics, and the like of the carbon fiber reinforced resin, and is not particularly limited.

The length and fiber diameter of the carbon fiber are appropriately set depending on applications, characteristics, and the like of the carbon fiber reinforced resin, and are not particularly limited.

A proportion of the carbon fibers contained in the carbon fiber reinforced resin is appropriately set depending on applications, characteristics, and the like of the carbon fiber reinforced resin, and is not particularly limited.

(Matrix Resin)

The matrix resin may be a thermosetting resin or a thermoplastic resin. The thermosetting resin may be an uncured product or a cured product.

Examples of thermosetting resins include an epoxy resin, an unsaturated polyester resin, a vinyl ester resin, a phenolic resin, a cyanate resin, and a polyimide resin.

Thermosetting resins may be used alone or two or more thereof may be used in combination.

Examples of thermoplastic resins include a polyamide, a polyolefin, a polyester, a polycarbonate, an acrylic resin, an acrylonitrile-butadiene-styrene copolymer, a polyetheretherketone, and a polyphenylene sulfide.

Thermoplastic resins may be used alone or two or more thereof may be used in combination.

The matrix resin may contain an additive as necessary. Examples of additives include a curing agent, a curing aid, an internal mold release agent, a flame retardant, an antioxidant, a light stabilizer, a UV absorber, and a colorant.

A proportion of the matrix resin contained in the carbon fiber reinforced resin is appropriately set depending on applications, characteristics, and the like of the carbon fiber reinforced resin, and is not particularly limited.

<Method of Producing Reclaimed Carbon Fiber Bundles, Reclaimed Carbon Fibers, or Reclaimed Milled Carbon Fibers>

A method of producing reclaimed carbon fiber bundles, reclaimed carbon fibers or reclaimed milled carbon fibers according to the present invention is a method in which pieces of carbon fiber base material are collected from a carbon fiber reinforced resin and are reclaimed as reclaimed carbon fiber bundles, reclaimed carbon fibers or reclaimed milled carbon fibers.

Specifically, the method of producing reclaimed carbon fiber bundles, reclaimed carbon fibers, or reclaimed milled carbon fibers according to the present invention includes the following processes.

Process (a): A process of cutting a carbon fiber reinforced resin as necessary.

Process (b): A process of heating the carbon fiber reinforced resin and thermally decomposing a matrix resin to obtain a heat-treated product.

Process (c): A process of crushing the heat-treated product and separating a plurality of pieces of carbon fiber base material into individual reclaimed carbon fiber bundles.

Process (d): A process of classifying the reclaimed carbon fiber bundles separated by crushing according to the form of the reclaimed carbon fiber bundle as necessary.

Process (e): A process of processing the reclaimed carbon fiber bundles separated by crushing into another form as necessary.

Process (f): A process of additionally heating the reclaimed carbon fiber bundles separated by crushing under an oxidizing atmosphere and reducing the resin residue as necessary.

Process (g): A process of processing the reclaimed carbon fiber bundles separated by crushing or reclaimed carbon fibers obtained by additionally performing heating under an oxidizing atmosphere as necessary into reclaimed milled carbon fibers as necessary.

(Process (a))

When the carbon fiber reinforced resin is a large molded article or the like, since it may not enter a heat treatment device directly in the process (b) to be described below, or it may not pass through a crusher in the process (c), the carbon fiber reinforced resin is cut into an appropriate size using a cutting machine as necessary.

When the carbon fiber reinforced resin is cut, since as long fiber bundles as possible can be collected, it is preferable to cut the carbon fiber reinforced resin in the longitudinal direction of the long fiber bundles contained in the carbon fiber reinforced resin.

(Process (b))

The matrix resin is thermally decomposed (gasification, carbonization, etc.) by heating the carbon fiber reinforced resin and thereby a heat-treated product is obtained In the heat-treated product, a plurality of pieces of carbon fiber base material become fixed to each other due to the resin residue such as thermal decomposition products (carbide, etc.) of the matrix resin. Voids are generated between the pieces of carbon fiber base material of the heat-treated product due to a heat treatment, and generally, the thickness of a processing object after a heat treatment is larger than that before the heat treatment.

The carbon fiber reinforced resin is heated using, for example, a heat treatment device including a heating furnace.

Regarding the heat treatment device, for example, the following devices may be exemplified.

FIG. 1 is a configuration diagram schematically showing an example of a heat treatment device. A heat treatment device 1 includes a loading/slow cooling chamber 10 into which a carbon fiber reinforced resin 100 is loaded and from which a heat-treated product 102 is unloaded and of which the inside is purged with nitrogen gas, and a heating furnace 12 in which the carbon fiber reinforced resin 100 is heated.

Figure 2:
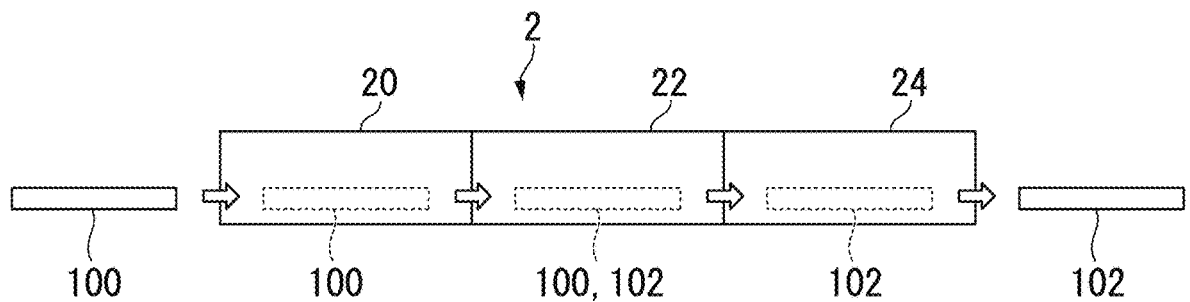
FIG. 2 is a configuration diagram schematically showing another example of the heat treatment device.

FIG. 2 is a configuration diagram schematically showing another example of the heat treatment device. A heat treatment device 2 includes a loading chamber 20 into which the carbon fiber reinforced resin 100 is loaded and of which the inside is purged with nitrogen gas, a heating furnace 22 in which the carbon fiber reinforced resin 100 is heated, and a slow cooling chamber 24 from which the heat-treated product 102 is unloaded and of which the inside is purged with nitrogen gas.

Figure 3:
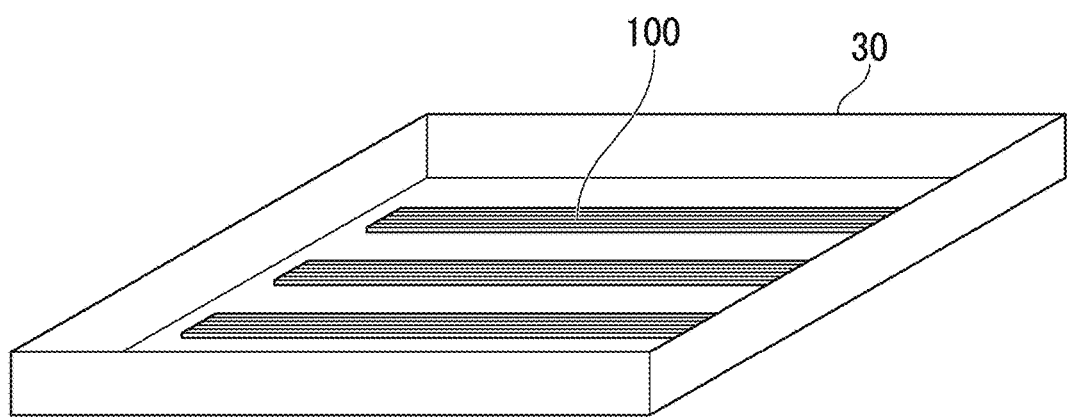
FIG. 3 is a perspective view showing an example of a state in which pieces of carbon fiber reinforced resin are accommodated in a tray.

For example, as shown in FIG. 3, the carbon fiber reinforced resin 100 that is placed in a mesh tray 30 is loaded into the heat treatment device.

Examples of heating furnaces include a batch type heating furnace such as an electric furnace; and a continuous type heating furnace for pusher transfer or belt transfer.

A nitrogen gas supply source, a superheated steam generating device, and the like are connected to the heating furnace.

A nitrogen gas supply source, and the like are connected to the slow cooling chamber and the loading chamber.

The heat treatment device may include a burner that burns exhaust gas discharged from the heating furnace and the like.

The inside of the heating furnace has either an oxidizing atmosphere or a non-oxidizing atmosphere. A non-oxidizing atmosphere is preferable because deterioration due to oxidation on the surface of the carbon fiber can be reduced. Regarding the non-oxidizing atmosphere, either an atmosphere containing no oxygen gas or an atmosphere substantially containing no oxygen gas can be used. An inert gas containing no oxygen gas or substantially containing no oxygen gas may be appropriately introduced into the heating furnace. Regarding the inert gas, a nitrogen gas atmosphere or a superheated steam atmosphere is preferable because the matrix resin can be sufficiently thermally decomposed. A superheated steam atmosphere is more preferable because it has high heat conductivity.

In the present invention, since the heat-treated product is crushed and the plurality of pieces of carbon fiber base material are separated into individual reclaimed carbon fiber bundles in the process (c) to be described below, it is not necessary to sufficiently reduce the resin residue fixed between a plurality of pieces of carbon fiber base material by performing heating to a 800° C. or higher as in the method described in Patent Document 2.

The temperature at which the carbon fiber reinforced resin is heated is preferably 300 to 700° C., more preferably 400 to 700° C., and most preferably 500 to 700° C. When the heating temperature is equal to or larger than the lower limit value in the range, the matrix resin can be sufficiently thermally decomposed. When the heating temperature is equal to or lower than the upper limit value in the range, energy costs can be reduced and facility specifications can be less expensive. The heating temperature is a temperature in the atmosphere in the heating furnace.

The pressure at which the carbon fiber reinforced resin is heated is generally a slight pressure or a slight negative pressure (reduced pressure).

A time for which the carbon fiber reinforced resin is heated may be appropriately set in the range of 10 to 180 minutes depending on the heating temperature. The heating time is preferably 10 to 180 minutes, and more preferably 30 to 120 minutes. When the heating time is equal to or larger than the lower limit value in the range, the matrix resin can be sufficiently thermally decomposed. When the heating time is equal to or lower than the upper limit value in the range, the throughput can be improved and a reclamation treatment can be performed at low cost.

(Process (c))

When the heat-treated product is crushed, at least a part of the resin residue fixed between the plurality of pieces of carbon fiber base material falls off, and the plurality of pieces of carbon fiber base material are separated into individual reclaimed carbon fiber bundles. In addition, when the excess resin residue falls off, the variation in the resin residue content in the collected reclaimed carbon fiber bundles is reduced.

The heat-treated product can be crushed by applying a pressure to the heat-treated product, by applying compression, tension, and shear stress, or applying an impact while minimizing breakage of the carbon fiber base material.

Examples of a crusher that is configured to crush a heat-treated product include a biaxial roller crusher, a multi-axis roller crusher having three or more axes, and a hammer crusher. The rollers may be arranged in the multi-axis roller crusher in a rectangular or staggered arrangement pattern. In the case of staggered arrangement, since sufficient stress can be applied to the heat-treated product, there is no need to provide irregularities on the surface of the rollers. A biaxial roller crusher or a hammer crusher is preferable. A plurality of crushers may be combined. In order to minimize breakage of the carbon fiber base material, it is preferable that a sharp object such as a blade be not included in a part of the crusher that comes in contact with the heat-treated product.

Figure 4:
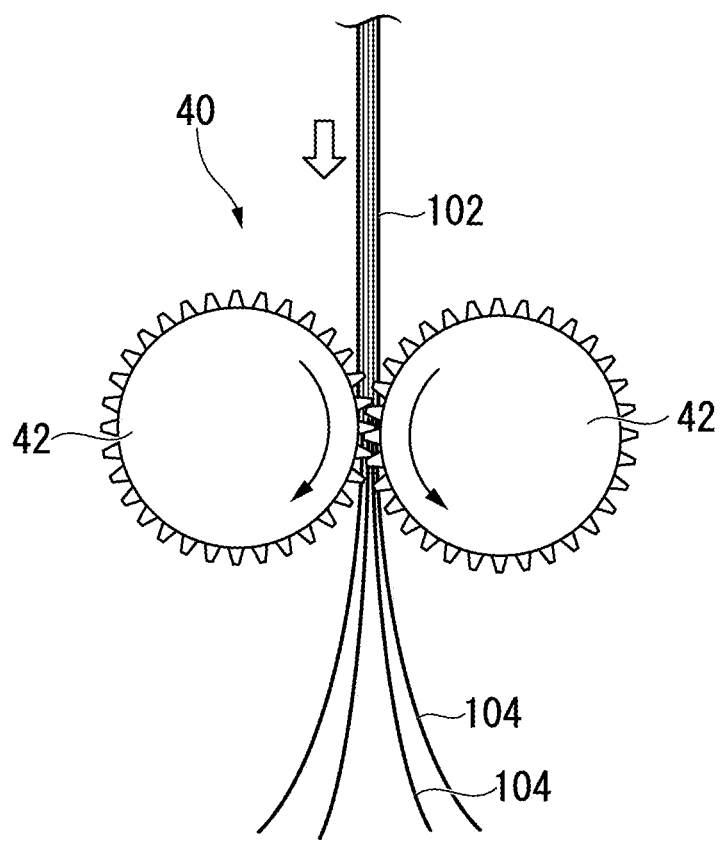
FIG. 4 is a schematic view showing a state in which a heat-treated product is crushed by a biaxial roller crusher.

FIG. 4 is a schematic view showing a state in which a heat-treated product is crushed by a biaxial roller crusher.

In a biaxial roller crusher 40, two rollers 42 having irregularities on the surface are disposed so that they abut each other. The two rollers 42 rotate in directions opposite to each other in a direction in which the heat-treated product 102 travels (in the shown example, a direction from the top to the bottom). When the heat-treated product 102 passes between the two rollers 42, a pressure is applied to the heat-treated product 102 due to the irregularities on the surfaces of the rollers 42, and the heat-treated product 102 is crushed and separated into a plurality of pieces of carbon fiber base material (reclaimed carbon fiber bundle) 104.

Figure 5:
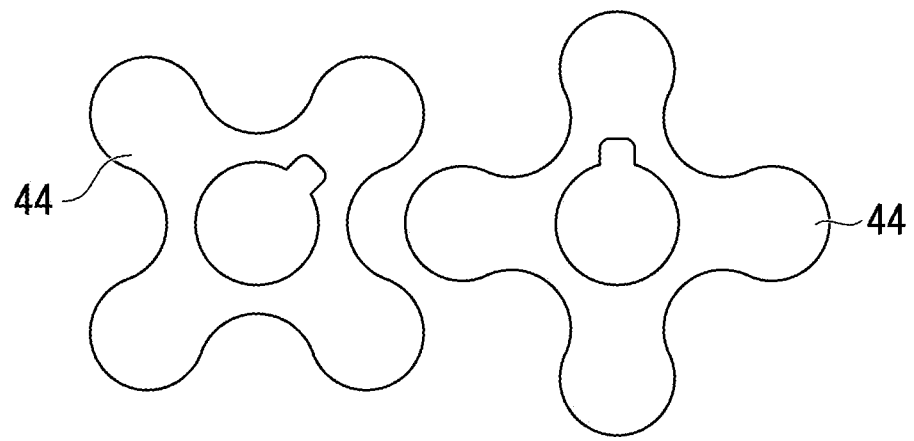
FIG. 5 is a schematic view showing another example of the biaxial roller crusher.

The biaxial roller crusher is not limited to that shown in FIG. 4. For example, as shown in FIG. 5, two rollers 44 having a cruciform cross section may be disposed so that they abut each other.

(Process (d))

When there are two or more types of forms of carbon fiber base material contained in the carbon fiber reinforced resin, it is preferable to classify the reclaimed carbon fiber bundles separated by crushing the heat-treated product according to the form of the reclaimed carbon fiber bundle in order to increase the utility value for the reclaimed carbon fiber.

Figure 6:
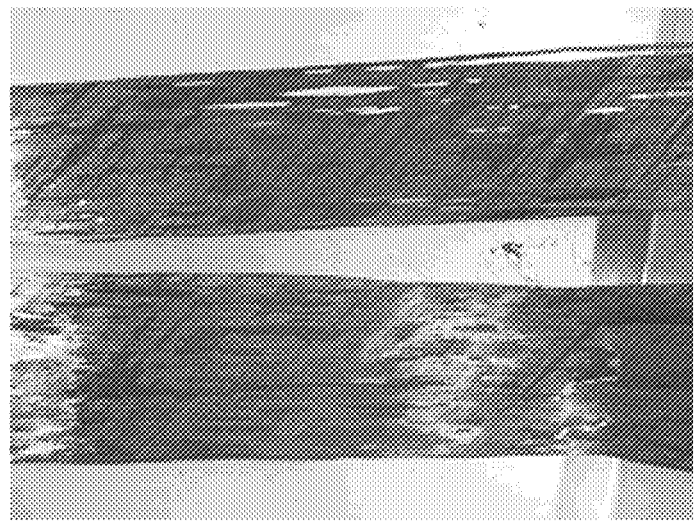
FIG. 6 is an image showing an example of pieces of carbon fiber base material (long fiber bundles) separated by crushing a heat-treated product.
Figure 7:
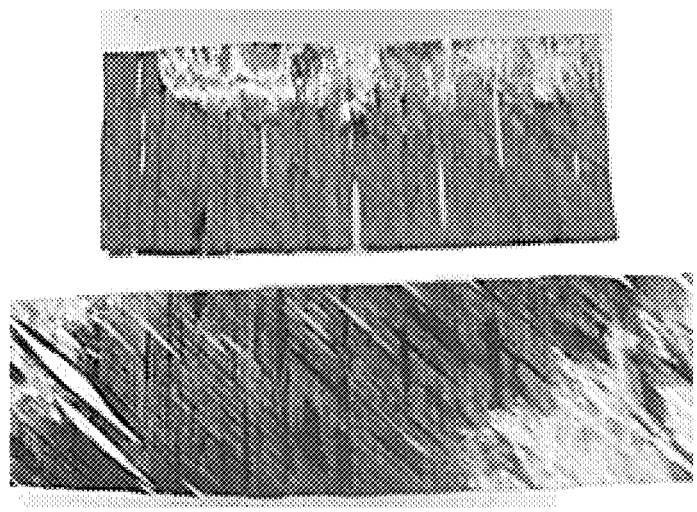
FIG. 7 is an image showing an example of pieces of carbon fiber base material (short fiber bundles) separated by crushing a heat-treated product.
Figure 8:
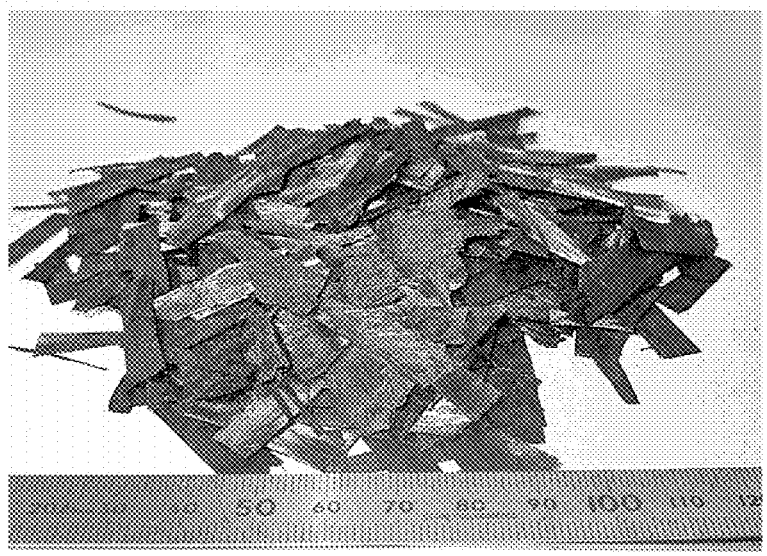
FIG. 8 is an image showing an example of pieces of carbon fiber base material (chopped carbon fibers) separated by crushing a heat-treated product.

For example, the reclaimed carbon fiber bundles separated by crushing may be classified into long fiber bundles arranged in a longitudinal direction of the carbon fiber reinforced resin as shown in FIG. 6; short fiber bundles arranged in a width direction of the carbon fiber reinforced resin or an oblique direction with respect to a longitudinal direction of the carbon fiber reinforced resin as shown in FIG. 7; a fabric such as a plain weave (not shown); chip-like carbon fiber bundles (chopped carbon fibers) as shown in FIG. 8, and the like, and thus respective carbon fiber bundles are reused as reclaimed carbon fiber bundles for applications according to respective forms.

Since the reclaimed carbon fiber bundles separated by crushing contain a small amount of resin residue, the plurality of carbon fibers constituting the carbon fiber bundle become fixed to each other due to the resin residue. Therefore, it is difficult for long fiber bundles and short fiber bundles to be separated into carbon fibers, and the form of the carbon fiber bundle can be maintained even after crushing. Therefore, the reclaimed carbon fiber bundles separated by crushing are easily classified according to the form of the reclaimed carbon fiber bundle.

The average value of thicknesses of the collected reclaimed carbon fiber bundles is 0.01 to 1 mm, preferably 0.01 to 1 mm, more preferably 0.1 to 0.8 mm, and most preferably 0.2 to 0.7 mm. When the average value of thicknesses of the reclaimed carbon fiber bundles is equal to or larger than the lower limit value in the range, the form of the carbon fiber bundle can be sufficiently maintained. When the average value of thicknesses of the reclaimed carbon fiber bundles is equal to or lower than the upper limit value in the range, secondary processing such as cutting, disintegrating, or pulverizing is easy and wearing of the blade can be reduced. In addition, compared to the case where reclaimed carbon fibers that have not been crushed are subjected to a secondary heat treatment under an oxidizing atmosphere, the reclaimed carbon fiber bundles that have been crushed have a significantly increased surface area so that a uniform heat treatment can be performed. In addition, quantitative feeding properties are improved.

The standard deviation of the thicknesses of the collected reclaimed carbon fiber bundles is 0.01 to 0.5 mm, preferably 0.03 to 0.3 mm, and more preferably 0.05 to 0.2 mm. When the standard deviation of the thicknesses of the reclaimed carbon fiber bundles is equal to or larger than the lower limit value in the range, productivity is favorable. When the standard deviation of the thicknesses of the reclaimed carbon fiber bundles is equal to or lower than the upper limit value in the range, secondary processing such as cutting, disintegrating, or pulverizing is easy and wearing of the blade can be reduced. In addition, compared to the case where reclaimed carbon fibers that have not been crushed are subjected to a secondary heat treatment under an oxidizing atmosphere, the reclaimed carbon fiber bundles that have been crushed have a significantly increased surface area so that a uniform heat treatment can be performed. In addition, quantitative feeding properties are improved.

The resin residue content in the collected reclaimed carbon fiber bundles is preferably 0.1 to 30 mass %, more preferably 10 to 28 mass %, and still more preferably 13 to 26 mass %, and most preferably 20 to 25 mass % with respect to 100 mass % of the carbon fiber base material. When the resin residue content in the reclaimed carbon fiber bundles is equal to or larger than the lower limit value in the range, the form of the carbon fiber bundles can be maintained in the long fiber bundles and the short fiber bundles even after crushing. When the resin residue content in the reclaimed carbon fiber bundles is equal to or lower than the upper limit value in the range, the amount of resin residue as an impurity is reduced, and the quality of the reclaimed carbon fiber bundles is improved.

The standard deviation of the resin residue contents in the collected reclaimed carbon fiber bundles is preferably 0 to 3%, more preferably 0 to 2%, and most preferably 0 to 1%. When the standard deviation of the resin residue contents in the reclaimed carbon fiber bundles is equal to or lower than the upper limit value in the range, the variation in the resin residue content in the collected reclaimed carbon fiber bundles is reduced, and reclaimed carbon fiber bundles with high uniformity are obtained.

(Process (e))

The reclaimed carbon fiber bundles separated by crushing may be processed into another form.

For example, the separated reclaimed carbon fiber bundles may be cut using a cutting machine such as a slitter, a guillotine, or a rotary cutter to obtain chip-like reclaimed carbon fiber bundles. Among the reclaimed carbon fiber bundles, a carbon fiber fabric is preferably separated out and cut to obtain chip-like reclaimed carbon fiber bundles. Among the reclaimed carbon fiber bundles, long fiber bundles are preferably separated out and cut to obtain chopped reclaimed carbon fiber bundles.

(Process (f))

The resin residue is contained in the reclaimed carbon fiber bundles separated by crushing. In order to obtain reclaimed carbon fibers with a reduced amount of resin residue, the reclaimed carbon fiber bundles separated by crushing may be additionally heated under an oxidizing atmosphere to oxidize and reduce the amount of resin residue. Regarding the oxidizing atmosphere, any atmosphere containing oxygen gas can be used. The concentration of the oxygen gas is preferably 0.1 to 25 volume %.

The reclaimed carbon fiber bundles heated under an oxidizing atmosphere become carbon fiber bundles when the resin residue is not sufficiently removed, and becomes cotton-like carbon fibers when the resin residue is sufficiently removed.

The temperature at which the reclaimed carbon fiber bundles are heated is preferably 300 to 700° C., more preferably 400 to 600° C., and most preferably 450 to 550° C. When the heating temperature is equal to or larger than the lower limit value in the range, the resin residue can be sufficiently removed. When the heating temperature is equal to or lower than the upper limit value in the range, the reclaimed carbon fiber is unlikely to deteriorate due to oxidation, and mechanical properties of the reclaimed carbon fiber and the like are unlikely to deteriorate.

The pressure at which the reclaimed carbon fiber bundles are heated is generally a slight pressure or a slight negative pressure (reduced pressure).

A time for which the reclaimed carbon fiber bundles are heated may be appropriately set in the range of 10 to 180 minutes depending on the heating temperature. The heating time is preferably 10 to 180 minutes and more preferably 30 to 120 minutes. When the heating time is equal to or larger than the lower limit value in the range, the resin residue can be sufficiently removed. When the heating temperature is equal to or lower than the upper limit value in the range, the throughput can be improved.

(Process (g))

The separated reclaimed carbon fiber bundles may be finely pulverized using a known pulverizer to obtain a reclaimed milled carbon fiber.

(Action Mechanism)

In the method of producing reclaimed carbon fiber bundles, reclaimed carbon fibers, or reclaimed milled carbon fibers according to the present invention described above, since a carbon fiber reinforced resin is heated and a matrix resin is thermally decomposed to obtain a heat-treated product, and the heat-treated product is crushed and a plurality of pieces of carbon fiber base material are separated into individual reclaimed carbon fiber bundles, it is not necessary to sufficiently reduce the amount of the resin residue fixed between the plurality of pieces of carbon fiber base material by performing heating to 800° C. or higher. Therefore, even if the carbon fiber reinforced resin is not heated at 800° C. or higher, pieces of carbon fiber base material that are contained in the carbon fiber reinforced resin can be directly collected as the reclaimed carbon fiber bundles. Then, the collected reclaimed carbon fiber bundles (long fiber bundles, short fiber bundles, fabrics, etc.), reclaimed carbon fibers, and reclaimed milled carbon fibers can be reused for various applications as the reclaimed carbon fibers.

In addition, in the method of producing reclaimed carbon fiber bundles, reclaimed carbon fibers, or reclaimed milled carbon fibers according to the present invention, since the heat-treated product is crushed, at least a part of the resin residue fixed between the plurality of pieces of carbon fiber base material falls off. Therefore, when the excess resin residue falls off, the variation in the resin residue content in the collected reclaimed carbon fiber bundles is reduced.

<Method of Producing a Carbon Fiber Reinforced Resin>

The method of producing a carbon fiber reinforced resin according to the present invention is a method in which reclaimed carbon fiber bundles, reclaimed carbon fibers, and reclaimed milled carbon fibers are obtained according to the method of producing reclaimed carbon fiber bundles, reclaimed carbon fibers, or reclaimed milled carbon fibers according to the present invention, and a carbon fiber reinforced resin containing reclaimed carbon fiber bundles, reclaimed carbon fibers, reclaimed milled carbon fibers, and a matrix resin is produced.

A specific method of producing a carbon fiber reinforced resin includes the following method (α).

Method (α): A method in which reclaimed carbon fiber bundles, reclaimed carbon fibers, reclaimed milled carbon fibers, and a thermoplastic resin are kneaded to obtain a kneaded material, and the kneaded material is processed into pellets.

Examples of reclaimed carbon fiber bundles, reclaimed carbon fibers, and reclaimed milled carbon fibers that can be used in the method (α) include long fiber bundles, short fiber bundles, carbon fiber fabrics, chip-like carbon fiber bundles, cotton-like carbon fibers, and milled carbon fibers.

Examples of thermoplastic resins that can be used in the method (α) include a polyamide, a polyolefin, a polyester, a polycarbonate, an acrylic resin, an acrylonitrile-butadiene-styrene copolymer, a polyetheretherketone, and a polyphenylene sulfide.

In the method (α), for example, reclaimed carbon fibers and a thermoplastic resin are kneaded using an extruder, the kneaded material is extruded as a strand from a die, the strand is cooled, and then cut with a pelletizer, and thereby pellets are obtained.

<Device for Producing Reclaimed Carbon Fiber>

The device for producing reclaimed carbon fiber bundles according to the present invention is a device for obtaining pieces of carbon fiber base material from a carbon fiber reinforced resin as reclaimed carbon fibers, and includes a heating furnace that heats a carbon fiber reinforced resin to obtain a heat-treated product and a crusher that crushes the heat-treated product.

Regarding the heating furnace, a heating furnace in the above heat treatment device may be exemplified.

Examples of a crusher include the biaxial roller crusher, the multi-axis roller crusher having three or more axes, and the hammer crusher described above. The rollers may be arranged in the multi-axis roller crusher in a rectangular or staggered arrangement pattern. In the case of staggered arrangement, since sufficient stress can be applied to the heat-treated product, there is no need to provide irregularities on the surface of the rollers. A biaxial roller crusher or a hammer crusher is preferable. A plurality of crushers may be combined. In order to minimize breakage of the carbon fiber base material, it is preferable that a sharp object such as a blade be not included in a part of the crusher that comes in contact with the heat-treated product.

The device for producing reclaimed carbon fiber bundles according to the present invention may further include, as necessary, a loading chamber and a slow cooling chamber attached to the heating furnace; a supply source that supplies nitrogen gas to the heating furnace, the loading chamber, the slow cooling chamber, and the like; a superheated steam generating device that supplies superheated steam to the heating furnace and the like; a burner that burns exhaust gas discharged from the heating furnace and the like.

EXAMPLES

While the present invention will be described below in more detail with reference to examples, the present invention is not limited thereto.

<Evaluation>

The evaluation methods in examples are shown below.
(Separation State of Pieces of Carbon Fiber Base Material)

The separation states of the plurality of pieces of carbon fiber base material (reclaimed carbon fiber bundle) before and after the heat-treated product was crushed were observed, and evaluated according to the following criteria.

Separated: separated into pieces of carbon fiber base material.

Fixed: not separated into pieces of carbon fiber base material.

(Hardness of Carbon Fiber Base Material)

The hardness of the pieces of carbon fiber base material (reclaimed carbon fiber bundle) separated by crushing was evaluated according to the following criteria.

Hard: when touched by hand, the hardness was appropriate.

Soft: when touched by hand, it was soft like a cloth.
(Resin Residue Content in Carbon Fiber Base Material)

The resin residue content in the pieces of carbon fiber base material (reclaimed carbon fiber bundle) separated by crushing was obtained by determining a fiber mass content of the reclaimed carbon fiber bundles according to a sulfuric acid decomposition method in JIS K 7075: 1991 and performing calculation from the formula "100−fiber mass content".

In addition, the standard deviation of the resin residue contents was obtained by measuring the resin residue content x at arbitrary 5 points (n=5) on unspecified reclaimed carbon fiber bundles and performing calculation from the above Formula (1).

(Thickness of Reclaimed Carbon Fiber Bundle)

The average value of thicknesses of the reclaimed carbon fiber bundles was calculated by measuring the thickness of the reclaimed carbon fiber bundle at an arbitrary 30 points on unspecified reclaimed carbon fiber bundles and averaging the values.

The standard deviation of the thicknesses of the reclaimed carbon fiber bundles was calculated from the above Formula (1) by measuring the thickness x of the reclaimed carbon fiber bundle at an arbitrary 30 points on unspecified reclaimed carbon fiber bundles.

<Carbon Fiber Reinforced Resin>

Regarding the carbon fiber reinforced resin, a molded article of a plate-like carbon fiber reinforced resin with a thickness of about 10 mm (type of carbon fiber: PAN-based carbon fibers, a state in which pieces of carbon fiber base material were laminated: 45°-oriented fiber bundle/0°-oriented fiber bundle/90°-oriented fiber bundle/plain weave fabrics were randomly laminated, type of matrix resin: a cured product of an epoxy resin) was prepared.

This was cut to a size with 50 cm length and 5 cm width to obtain a plurality of pieces of carbon fiber reinforced resin for processing.

Example 1

The carbon fiber reinforced resin for processing was put into an electric furnace, and while exhaust gas was discharged from the electric furnace, superheated steam was continuous supplied to the electric furnace to maintain an superheated steam atmosphere in the electric furnace, the carbon fiber reinforced resin for processing was heated at 500° C. for 120 minutes, and thereby a heat-treated product was obtained.

The heat-treated product was crushed by a biaxial roller crusher and separated into a plurality of pieces of carbon fiber base material (reclaimed carbon fiber bundle). The results are shown in Table 1. The pieces of carbon fiber base material (reclaimed carbon fiber bundle) having a small thickness, a small variation in the resin residue content, and high uniformity were obtained.

Example 2

Pieces of carbon fiber base material (reclaimed carbon fiber bundle) were obtained in the same manner as in Example 1 except that the heating temperature was changed to 600° C. The results are shown in Table 1. The pieces of carbon fiber base material (reclaimed carbon fiber bundle) having a small thickness, a small variation in the resin residue content, and high uniformity were obtained.

Example 3

Pieces of carbon fiber base material (reclaimed carbon fiber bundle) were obtained in the same manner as in Example 1 except that the heating temperature was changed to 700° C. The results are shown in Table 1. The pieces of carbon fiber base material (reclaimed carbon fiber bundle) having a small thickness, a small variation in the resin residue content, and high uniformity were obtained.

Example 4

The heat-treated product obtained in the same manner as in Example 1 were crushed 10 times by a biaxial roller crusher. The results are shown in Table 1. As the number of times crushing was performed increased, pieces of carbon fiber base material (reclaimed carbon fiber bundle) gradually became soft, and finally became as soft as a cloth. The hardness of the reclaimed carbon fiber bundle could be controlled by changing the number of times crushing was performed.

Example 5

Among the plurality of pieces of carbon fiber base material (reclaimed carbon fiber bundle) obtained in the same manner as in Example 1, the long fiber bundle was cut to a size with a width of 5 mm and a length (fiber length) of 10 mm to obtain chip-like reclaimed carbon fiber bundles. The results are shown in Table 1. The long fiber bundle could be easily cut. The chip-like reclaimed carbon fiber bundles having a small thickness, a small variation in the resin residue content, and high uniformity were obtained.

Example 6

Among the plurality of pieces of carbon fiber base material (reclaimed carbon fiber bundle) obtained in the same manner as in Example 1, the long fiber bundle was cut to a size with a width of 5 mm and a length (fiber length) of 20 mm to obtain chip-like reclaimed carbon fiber bundles. The results are shown in Table 1. The long fiber bundle could be easily cut. The chip-like reclaimed carbon fiber bundles having a small thickness, a small variation in the resin residue content, and high uniformity were obtained.

Example 7

Pieces of carbon fiber base material (reclaimed carbon fiber bundle) were obtained in the same manner as in Example 1 except that nitrogen gas was used in place of superheated steam. The results are shown in Table 1. Reclaimed carbon fiber bundles having a small thickness, a small variation in the resin residue content, and high uniformity were obtained.

Example 8

Pieces of carbon fiber base material (reclaimed carbon fiber bundle) were obtained in the same manner as in Example 7 except that the heating temperature was changed to 600° C. The results are shown in Table 1. Reclaimed carbon fiber bundles having a small thickness, a small variation in the resin residue content, and high uniformity were obtained.

Example 9

Pieces of carbon fiber base material (reclaimed carbon fiber bundle) were obtained in the same manner as in Example 7 except that the heating temperature was changed to 700° C. The results are shown in Table 1. Reclaimed carbon fiber bundles having a small thickness, a small variation in the resin residue content, and high uniformity were obtained.

Example 10

Pieces of carbon fiber base material (reclaimed carbon fiber bundle) were obtained in the same manner as in Example 2 except that a laminate in which a plurality of prepregs were laminated was used in place of a carbon fiber reinforced resin for processing. After the heat treatment, a plurality of prepregs became fixed to each other due to the resin residue such as thermal decomposition products (carbide, etc.) of the matrix resin, but they were separated into individual pieces of carbon fiber base material (reclaimed carbon fiber bundle) by crushing. The results are shown in Table 1. Reclaimed carbon fiber bundles having a small thickness, a small variation in the resin residue content, and high uniformity were obtained.

Example 11

Chip-like pieces of carbon fiber base material (reclaimed carbon fiber bundle) were obtained in the same manner as in Example 2 except that a sheet molding compound (SMC) was used in place of a carbon fiber reinforced resin for processing. The results are shown in Table 1. Reclaimed carbon fiber bundles having a small thickness, a small variation in the resin residue content, and high uniformity were obtained.

Comparative Example 1

A heat-treated product was performed in the same manner as in Example 1. The results are shown in Table 1. It was confirmed that voids were generated between the pieces of carbon fiber base material of the heat-treated product, and the thickness increased after the heat treatment compared with the thickness of the processing object before the heat treatment. In addition, the heat-treated product was in a state in which the pieces of carbon fiber base material became fixed to each other due to the resin residue (carbide, etc.) and were not separated into pieces of carbon fiber base material (reclaimed carbon fiber bundle) and thus chipping was difficult. A heat-treated product having a large variation in the resin residue content and low uniformity was obtained.

Comparative Example 2

A heat-treated product was obtained in the same manner as in Example 5. The results are shown in Table 1. It was confirmed that voids were generated between the pieces of carbon fiber base material of the heat-treated product, and the thickness increased after the heat treatment compared with the thickness of the processing object before the heat treatment. In addition, the heat-treated product was in a state in which the pieces of carbon fiber base material became fixed to each other due to the resin residue (carbide, etc.) and were not separated into pieces of carbon fiber base material (reclaimed carbon fiber bundle) and thus chipping was difficult. A heat-treated product having a large variation in the resin residue content and low uniformity was obtained.

TABLE 1

| | Carbon fiber reinforced resin | Thermal decomposition atmosphere | Heating temperature [° C.] | Number of times crushing was performed | Chipping or not | Separation state of pieces of carbon fiber base material | |
|---|---|---|---|---|---|---|---|
| | | | | | | Before crushing | After crushing |
| Example 1 | Plate-like molded article | Superheated steam | 500 | 1 | No | Fixed | Separated |
| Example 2 | Plate-like molded article | Superheated steam | 600 | 1 | No | Fixed | Separated |
| Example 3 | Plate-like molded article | Superheated steam | 700 | 1 | No | Fixed | Separated |
| Example 4 | Plate-like molded article | Superheated steam | 600 | 10 | No | Fixed | Separated |
| Example 5 | Plate-like molded article | Superheated steam | 600 | 1 | Yes | Fixed | Separated |
| Example 6 | Plate-like molded article | Superheated steam | 600 | 1 | Yes | Fixed | Separated |
| Example 7 | Plate-like molded article | Nitrogen gas | 500 | 1 | No | Fixed | Separated |
| Example 8 | Plate-like molded article | Nitrogen gas | 600 | 1 | No | Fixed | Separated |
| Example 9 | Plate-like molded article | Nitrogen gas | 700 | 1 | No | Fixed | Separated |
| Example 10 | Laminate of prepregs | Superheated steam | 600 | 1 | No | Fixed | Separated |
| Example 11 | SMC | Superheated steam | 600 | 1 | No | Fixed | Separated |
| Comparative Example 1 | Plate-like molded article | Superheated steam | 600 | 0 | No | Fixed | Fixed |
| Comparative Example 2 | Plate-like molded article | Nitrogen gas | 600 | 0 | No | Fixed | Fixed |

| | Hardness | Resin residue content [%] | Standard deviation of resin residue contents [%] | Thickness of fiber bundles [mm] | Standard deviation of thicknesses of fiber bundles [mm] |
|---|---|---|---|---|---|
| Example 1 | Hard | — | — | — | — |
| Example 2 | Hard | 16 | 0.31 | 0.45 | 0.15 |
| Example 3 | Hard | — | — | — | — |
| Example 4 | Soft | — | — | — | — |
| Example 5 | Hard | 13.8 | 0.36 | — | — |
| Example 6 | Hard | 13.5 | 0.35 | — | — |
| Example 7 | Hard | — | — | — | — |
| Example 8 | Hard | — | — | — | — |
| Example 9 | Hard | — | — | — | — |
| Example 10 | Hard | — | — | — | — |
| Example 11 | Hard | 22.6 | — | 0.25 | 0.09 |

TABLE 1-continued

| | | | | | |
|---|---|---|---|---|---|
| Comparative Example 1 | Hard | 16.9 | 3.2 | >10 | — |
| Comparative Example 2 | Hard | 16.7 | 6.34 | >10 | — |

INDUSTRIAL APPLICABILITY

The method of producing reclaimed carbon fiber bundles, reclaimed carbon fibers, or reclaimed milled carbon fibers according to the present invention is beneficial as a method of collecting pieces of carbon fiber base material from the carbon fiber reinforced resin as reclaimed carbon fiber bundles, reclaimed carbon fibers, and reclaimed milled carbon fibers.

REFERENCE SIGNS LIST

1 Heat treatment device
2 Heat treatment device
10 Loading/slow cooling chamber
12 Heating furnace
20 Loading chamber
22 Heating furnace
24 Slow cooling chamber
30 Mesh tray
40 Biaxial roller crusher
42 Roller
44 Roller
100 Carbon fiber reinforced resin
102 Heat-treated product
104 Carbon fiber base material

What is claimed is:

1. A method of producing reclaimed carbon fiber bundles, which is a method of obtaining pieces of carbon fiber base material as reclaimed carbon fiber bundles from a carbon fiber reinforced resin comprising a plurality of pieces of the carbon fiber base material and a matrix resin, the method comprising:
   heating the carbon fiber reinforced resin and thermally decomposing the matrix resin to obtain a heat-treated product; and
   separating the heat-treated product into the plurality of the pieces of the carbon fiber base material by crushing,
   wherein the crushing is applying a pressure to the heat-treated product in which the plurality of pieces of the carbon fiber base material become fixed to each other due to a resin residue comprising matrix resin thermal decomposition products, thereby disintegrating the heat-treated product into individual pieces of the carbon fiber base material while minimizing breakage of the pieces of the carbon fiber base material,
   wherein the crushing and disintegrating are a common process comprising applying a pressure to the heat-treated product, by applying compression, tension, and shear stress, or applying an impact while minimizing breakage of the carbon fiber base material, making at least a part of the resin residue fixed between the plurality of pieces of the carbon fiber base material fall off, and separating the plurality of the pieces of the carbon fiber base material into individual reclaimed carbon fiber bundles.

2. The method of claim 1, wherein a temperature at which the carbon fiber reinforced resin is heated is in a range of from 300 to 700° C.

3. The method of claim 1, wherein the carbon fiber reinforced resin is heated under a non-oxidizing atmosphere.

4. The method of claim 3, wherein the non-oxidizing atmosphere is a nitrogen gas atmosphere or a superheated steam atmosphere.

5. The method of claim 1, wherein the heat-treated product is crushed by a biaxial roller crusher, a multi-axis roller crusher, or a hammer crusher.

6. The method of claim 1, wherein the pieces of carbon fiber base material separated by crushing are cut to obtain fiber bundle chips.

7. A method of producing reclaimed carbon fibers, the method comprising:
   obtaining reclaimed carbon fiber bundles using the method of claim 1; and
   additionally heating the reclaimed carbon fiber bundles under an oxidizing atmosphere.

8. A method of producing reclaimed milled carbon fibers, the method comprising:
   obtaining the reclaimed carbon fiber bundles or reclaimed carbon fibers from the reclaimed carbon fiber bundles using the method of claim 1; and
   pulverizing the reclaimed carbon fiber bundles or the reclaimed carbon fibers to obtain milled carbon fibers.

9. A method of producing a carbon fiber reinforced resin, the method comprising:
   obtaining reclaimed milled carbon fibers using the method of claim 8; and
   producing a carbon fiber reinforced resin comprising the reclaimed milled carbon fibers, and a matrix resin.

10. A method of producing carbon fiber reinforced resin pellets, the method comprising:
    obtaining reclaimed milled carbon fibers using the method of claim 8;
    kneading the reclaimed milled carbon fibers, and a thermoplastic resin to obtain a kneaded material; and
    processing the kneaded material into pellets.

11. A method of producing a carbon fiber reinforced resin, the method comprising:
    obtaining the reclaimed carbon fiber bundles or reclaimed carbon fibers from the reclaimed carbon fiber bundles using the method of claim 1; and
    producing a carbon fiber reinforced resin comprising the reclaimed carbon fiber bundles or the reclaimed carbon fibers, and a matrix resin.

12. A method of producing carbon fiber reinforced resin pellets, the method comprising:
    obtaining the reclaimed carbon fiber bundles or reclaimed carbon fibers from the reclaimed carbon fiber bundles using the method of claim 1;
    kneading the reclaimed carbon fiber bundles or the reclaimed carbon fibers, and a thermoplastic resin to obtain a kneaded material; and
    processing the kneaded material into pellets.

13. The method of claim 1, wherein the plurality of the pieces of the carbon fiber base material in the carbon fiber reinforced resin are laminated each other, and
    wherein the plurality of the pieces of the carbon fiber base material in the heat-treated product are separated into the plurality of the pieces of the carbon fiber base material in a direction which the laminated plurality of pieces of carbon fiber base material are peeling each other.

14. The method of claim 1, wherein the heat-treated product is crushed by a crusher, and
wherein a part of the crusher that comes in contact with the heat-treated product does not include a blade.

15. A method of producing reclaimed carbon fiber bundles, which is a method of obtaining pieces of carbon fiber base material as reclaimed carbon fiber bundles from a laminate in which a plurality of prepregs comprising the pieces of the carbon fiber base material and a matrix resin are laminated, the method comprising:
heating the laminate and thermally decomposing the matrix resin to obtain a heat-treated product; and
separating the heat-treated product into the plurality of the pieces of the carbon fiber base material by crushing,
wherein the crushing is applying a pressure to the heat-treated product in which the plurality of the pieces of the carbon fiber base material become fixed to each other due to a resin residue comprising matrix resin thermal decomposition products, thereby disintegrating the heat-treated product into individual pieces of the carbon fiber base material while minimizing breakage of the pieces of the carbon fiber base material,
wherein the crushing and disintegrating are a common process comprising applying a pressure to the heat-treated product, by applying compression, tension, and shear stress, or applying an impact while minimizing breakage of the carbon fiber base material, making at least a part of the resin residue fixed between the plurality of pieces of the carbon fiber base material fall off, and separating the plurality of the pieces of the carbon fiber base material into individual reclaimed carbon fiber bundles.

16. The method of claim 15, wherein the heat-treated product is crushed by a crusher, and
wherein a part of the crusher that comes in contact with the heat-treated product does not include a blade.

17. Reclaimed carbon fiber bundles having an average value of thicknesses that is in a range of from 0.01 to 1 mm, wherein a standard deviation of the thicknesses of the reclaimed carbon fiber bundles is in a range of from 0.01 to 0.5 mm.

18. The reclaimed carbon fiber bundles of claim 17, wherein an average resin residue amount with respect to a carbon fiber reinforced resin after a thermal decomposition treatment is 0.1 to 30 mass %.

19. A method of producing reclaimed carbon fiber bundles, which is a method of obtaining pieces of carbon fiber base material as the reclaimed carbon fiber bundles from a laminate in which a plurality of sheet molding compounds including the pieces of the carbon fiber base material and a matrix resin are laminated, the method comprising:
heating the laminate and thermally decomposing the matrix resin to obtain a heat-treated product; and
separating the heat-treated product into the plurality of the pieces of the carbon fiber base material by crushing,
wherein the crushing is applying a pressure to the heat-treated product in which the plurality of the pieces of the carbon fiber base material become fixed to each other due to a resin residue such as matrix resin thermal decomposition products, thereby disintegrating the heat-treated product into individual pieces of the carbon fiber base material while minimizing breakage of the pieces of the carbon fiber base material,
wherein the crushing and disintegrating are a common process comprising applying a pressure to the heat-treated product, by applying compression, tension, and shear stress, or applying an impact while minimizing breakage of the carbon fiber base material, making at least a part of the resin residue fixed between the plurality of pieces of the carbon fiber base material fall off, and separating the plurality of the pieces of the carbon fiber base material into individual reclaimed carbon fiber bundles.

20. The method of claim 19, wherein the heat-treated product is crushed by a crusher, and
wherein a part of the crusher that comes in contact with the heat-treated product does not include a blade.

* * * * *